(12) United States Patent
Zheng et al.

(10) Patent No.: US 8,184,405 B1
(45) Date of Patent: May 22, 2012

(54) AIR-BEARING SLIDER DESIGN FOR SUB-NANOMETER CLEARANCE IN HARD DISK DRIVE (HDD)

(75) Inventors: Guoqiang Zheng, San Ramon, CA (US); Ellis Cha, San Ramon, CA (US); Zhu Feng, Pleasanton, CA (US); Sindy Yeung, Fremont, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 0 days.

(21) Appl. No.: 12/930,753

(22) Filed: Jan. 14, 2011

(51) Int. Cl.
*G11B 5/55* (2006.01)
(52) U.S. Cl. .................................... 360/266.3
(58) Field of Classification Search ............. 360/264.2, 360/265.7, 265.9, 266.3, 265.1, 245.8
See application file for complete search history.

(56) References Cited

U.S. PATENT DOCUMENTS

| | | | |
|---|---|---|---|
| 5,490,025 A * | 2/1996 | Dorius et al. | 360/236.4 |
| 5,926,343 A * | 7/1999 | Dorius et al. | 360/235.6 |
| 6,226,859 B1 * | 5/2001 | Dorius et al. | 29/603.12 |
| 6,515,831 B1 | 2/2003 | Sannino et al. | |
| 6,809,904 B2 | 10/2004 | Boutaghou et al. | |
| 6,989,967 B2 | 1/2006 | Pendray et al. | |
| 7,009,813 B2 * | 3/2006 | Kang et al. | 360/235.7 |
| 7,245,455 B2 | 7/2007 | Rajakumar | |
| 7,706,106 B1 | 4/2010 | Mei et al. | |
| 2009/0219651 A1 | 9/2009 | Zheng et al. | |
| 2010/0128395 A1 | 5/2010 | Dorius | |

* cited by examiner

*Primary Examiner* — Allen Cao
(74) *Attorney, Agent, or Firm* — Saile Ackerman LLC; Saile B. Ackerman

(57) ABSTRACT

A slider is formed by a three-step ion milling process with an ABS topography that provides aerodynamic stability at sub-nanometer flying heights. The ABS design significantly eliminates the accumulation of lubricant and removes whatever lubricant does accumulate by use of a shallow dam at the trailing edge. In addition, a junction between a down-track channel and a cross-track channel directs airflow towards a center pad in which a transducer is embedded so that the pressure at the pad is enhanced even under high altitude conditions. The slider ABS is divided into two portions by a transverse deep air channel, but the channel is bridged by the cross-track channel which crosses the deep air channel with sides of unequal height. This dual height bridge allows variations in skew angle to be compensated so that pressure variations across the disk tracks are significantly reduced.

21 Claims, 9 Drawing Sheets

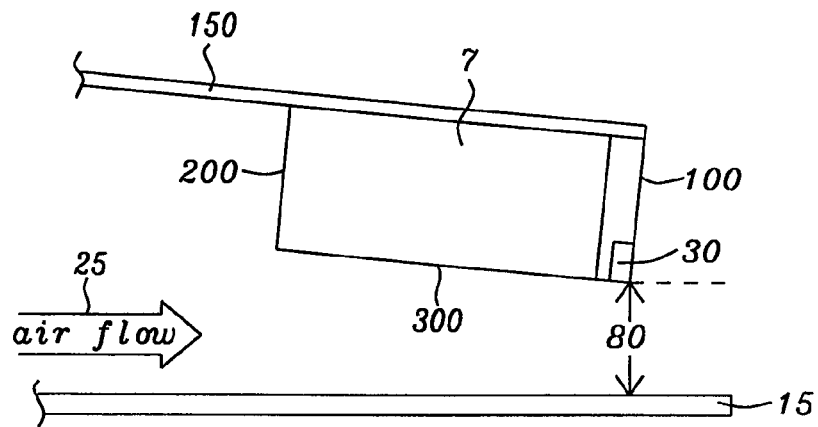
FIG. 1 - Prior Art
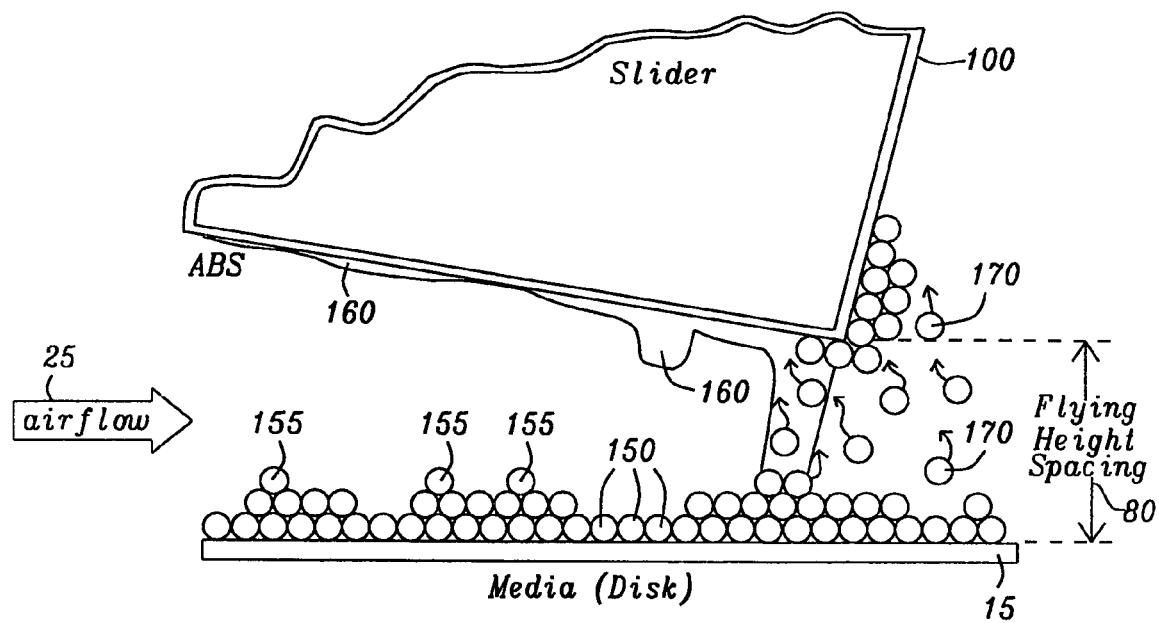
FIG. 2 - Prior Art 17.6

-0.915

AIR-BEARING SLIDER DESIGN FOR SUB-NANOMETER CLEARANCE IN HARD DISK DRIVE (HDD)

BACKGROUND OF THE INVENTION

1. Field of the Invention

This invention relates to the fabrication of slider-mounted thin film magnetic read/write heads and particularly to a method for forming a slider air bearing surface (ABS) suitable for sub-nanometer clearances.

2. Description of the Related Art

In magnetic hard disk drives (HDD) the data on a disk is recorded and retrieved by a transducer (or "element"). Each magnetic head element is embedded within a slider which is in aerodynamic flight over a rotating disk at a height (flying height) of 10 nm or less. Other than passive fly height (fly height without active operator intervention), the active spacing during read/write is actually becoming even less, perhaps as low as 2 nm, in order to achieve higher areal density and disk capacity. For example, so-called fly on demand (FOD) or dynamic fly height (DFH) is now applied to control magnetic spacing via the protrusion of an element/transducer caused by the thermal effects of a locally embedded heater.

Under conditions of such low clearance, a variety of proximity interactions, such as intermolecular forces (IMF), meniscus and electrostatic forces (ESF) as well as the influence of disk topography, tend to destabilize the air-bearing slider. Moreover, operating shocks, lubricant transfer, altitude variations, thermal variations and even humidity, all become additional perturbations that play an increasingly critical role in determining the aerodynamic stability and, therefore, the reliability of the slider. It has proven to be very difficult to find an appropriate design of the air-bearing surface (ABS) of a slider that will enable it to fulfill the stability requirements of current operational conditions.

More specifically with respect to operating shock, there are two major failure modes, liftoff and compression, which are induced by the loss or gain, respectively, of suspension preload on the slider. With current negative pressure air-bearing surface design, the slider is more susceptible to liftoff resistance than compression resistance. In other words, the anti-liftoff is usually much better than anti-compression and, as a result, heads now tend to fail as a result of compression shock, given the sub-nanometer clearance of current operational conditions. Furthermore, in the conventional air-bearing surface designs, compression shock is fully coupled with Z-height sensitivity, which involves drive assembly tolerances. Good Z-height sensitivity used to hurt compression shock performance, which is why drive suppliers, for now, most likely rely on suspension optimization to obtain improvement in shock performance.

As concerns lubricant transfer, typically there is a layer of lubricant between the disk (or media) surface and the slider. When the slider glides above the disk surface, the lubricant experiences a very high air-bearing pressure which, given the negative and positive pressures that occur during operation, produces lubricant depletion and pickup. The majority of the lubricant that is transferred from the disk to the slider resides in the trailig edg (TE) of the slider, since it is the TE that flies very close to the disk surface. With backflows, the lubricant then migrates forward (towards the leading edge (LE) of the slider), accumulating in the airflow stagnation region. Experiments continue to indicate that the backflows play an important role in lubricant migration from the TE of the slider to the center pad where the transducer is located. As a result, the read/write clearance cannot stabilize because the accumulating lubricant on the ABS affects the aerodynamics of the slider and further affects its stability and the reliability of the HDD.

Regarding the sensitivity of the slider to ambient conditions, most of the existing sliders are capable of acceptable altitude performance with the help of an on-board pressure sensor. However, in order to minimize the compensation error for different tracks, the uniformity of altitude loss across tracks is becoming more important than the altitude loss itself. The impact of thermal variations on slider crown and pitch static angle (PSA) becomes evident as yet another concern, since even minor variations in clearance caused by thermal crown and PSA will have a significant impact on read/write performance in the sub-nanometer range. As a result, air-bearing designs with less sensitivity to crown and PSA is highly recommended, particularly at the inner disk (ID) where disk distortion and waviness are usually more severe and prone to modulate with slider ABS topography.

Referring to schematic, prior-art FIG. 1, there is shown a portion of a hard disk drive (HDD) in which an encapsulated, small thin film magnetic read/write head (30), embedded in a ceramic substrate called a slider (7), is used to read and write data on a magnetic medium or storage disk (15). The read/write head (30) is formed using well known semiconductor deposition techniques such as electroplating, CVD (chemical vapor deposition) and photolithographic patterning and etching.

The slider (7) has a backside surface at which it attaches to the distal end of a head gimbal assembly (HGA) (150) and a patterned air-bearing surface (ABS) typically referred to as an ABS plane (300) that faces the rotating disk (15) during HDD operation. The ABS plane (300), shown here in a side view, only defines a virtual surface boundary of the patterned slider ABS, because the patterning actually incises the plane to create channels for airflow and to control the aerodynamics. These channels will be shown in later figures and cannot be seen in the side view here. The (HGA) (150) is activated by an electro-mechanical mechanism and electronic control circuitry to position the slider-mounted head at various positions along the magnetic tracks on the disk (tracks not shown).

As the disk is rapidly rotated by a spindle motor (not shown), hydrodynamic pressure causes an air flow (arrow, (25)) between the patterned ABS plane (300) of the slider (7) and the surface of the disk (15). This flow lifts the slider so that it literally flies above the surface of the disk at a "fly height" (80), supported on a layer of air. This fly height, in the prior art, is approximately 10 nm or less. The edge of the slider into which the disk rotates is called its "leading edge" (200), the opposite edge, which contains the read/write head (30), is called the "trailing edge" (100). The aerodynamics of the slider motion lifts the leading edge higher above the rotating disk surface than the trailing edge.

As schematically illustrated in FIG. 2, the surface of the disk (15) is typically covered by an irregular layer of lubricant, which is indicated here as small spherical beads (150). The beads cluster irregularly into small mounds or "moguls" (155). The airflow, indicated by arrow (25), beneath the ABS of the slider creates a distribution of air pressure against the ABS, which is schematically indicated by a curve (160). There is also shown the flow of lubricant (170) to the trailing edge surface (100) of the slider. The flow of lubricant to the trailing edge surface of the slider is a result of the very high air-bearing forces that act on both the ABS of the slider (as indicated by the pressure curve) and on the distribution of lubricant on the disk surface. These forces are instrumental in forming the lubricant moguls (155) as well as the lubricant transfers (170). The detailed causes of the lubricant behavior depend on both the forces and the lubricant properties, such as molecular roughness and cohesion. With the effect of negative pressure ABS design (to bring the slider close to the disk surface), the majority of the lubricant transferred to the slider is sucked beneath the trailing edge (100) of the slider ABS by a backflow of air that is oppositely directed to the arrow (25). The lubricant can be sucked into an air pocket within the patterned ABS of the slider (see FIG. 8B), where it accumulates and resides, because of the sub-ambient pressure within it. Elimination of this lubricant accumulation will be one of the objects of the present invention.

Now, however, there is a need in the HDD industry to employ a new concept in air-bearing surface design that can aid in sub-nanometer clearance applications. The role of ABS topography in improving slider performance is well known in the prior art and such a prior art slider was shown above.

Sannino et al. (U.S. Pat. No. 6,515,831) teaches a slider surface with channels for enhanced damping and a subambient pressure cavity. (US Publ. Patent Appl. 2009/0219651) teaches an air-bearing design for HDD applications. Dorius (US Pat. Appl. 2010/0128395) discloses a T-shaped channel with a bar and a lubricant accumulation barrier at its trailing edge. Pendray et al. (U.S. Pat. No. 6,989,967) shows a T-shaped center channel and side recesses that are not closed at the trailing edge. Bontaghou et al. (U.S. Pat. No. 6,809,904) shows a center cavity and two side dams at the trailing edge. Rajakumar (U.S. Pat. No. 7,245,455) discloses closed dams at two sides near the trailing edge. In addition, the role of the suspension in reducing the effects of shock is also known in the prior art. In this regard, Mei et al., (U.S. Pat. No. 7,706,106) teaches a hard disk drive suspension lifter with reinforcing features for high shock resistance. None of these prior art teachings address the problems to be addressed by the present invention.

SUMMARY OF THE INVENTION

The first is to provide a slider with an air-bearing surface (ABS) design that will aid in relieving sub-nanometer clearance problems in a HDD.

A second object of the present invention is to provide such an ABS design that will also eliminate problems associated with compression shock that are most commonly addressed by suspension design rather than ABS design.

A third object of the present invention is to provide such an ABS design that will provide an elimination of problems associated with backflow and lubricant accumulation.

A fourth object of the present invention is to provide a slider ABS design that will reduce sensitivity to crown, PSA and Z-height variations.

A fifth object of the present invention is to provide an ABS design that will provide a high damping coefficient so that the slider quickly reverts to a stable aerodynamic condition subsequent to an inadvertent head/disk interaction.

These objects will be achieved by a slider having an ABS topography in which a variable depth pattern of grooves and channels achieves a particularly advantageous airflow and pressure distribution (as will be described in greater detail below). First, a transverse (to a central axis) deep air groove is bisected longitudinally (along the central axis) by an asymmetric (in height) two-rail "dual-height bridge," so that skew effects and track-uniformity as a function of altitude are addressed. Next, a T-shaped configuration formed by two abutting channels, one longitudinal and one transverse, accumulates and directs airflow from the slider LE to a center pad at the TE, within which the transducer is embedded, even at the lowered pressures of high altitudes. A junction between the two segments of the T allows improvement of performance under compression shocks, without the necessity of utilizing the properties of the suspension. Adjusting the depths of these channels according to the performance characteristics of the HDD allows the building up of pressure on the center pad, thereby enhancing pitch and roll stiffness. Next, the disturbed airflow patterns beneath the flying slider produces high damping coefficients of pitch and roll modes at the natural frequencies of the air-bearing system. In addition, a shallow dam at the TE of the slider serves as a load/unload support mechanism and backflow blocker, which provides resistance to head/disk contacts during operation and reduces the accumulation of lubricant that would normally be picked up by the backflow.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic side-view drawing showing the features of a typical prior art slider that is in aerodynamic motion over as rotating disk.

FIG. 2 is a schematic side-view drawing showing the prior art slider of FIG. 1 flying above a lubricated disk, showing the transfer of lubricant to the slider.

DESCRIPTION OF THE PREFERRED EMBODIMENTS

Figure 3A:
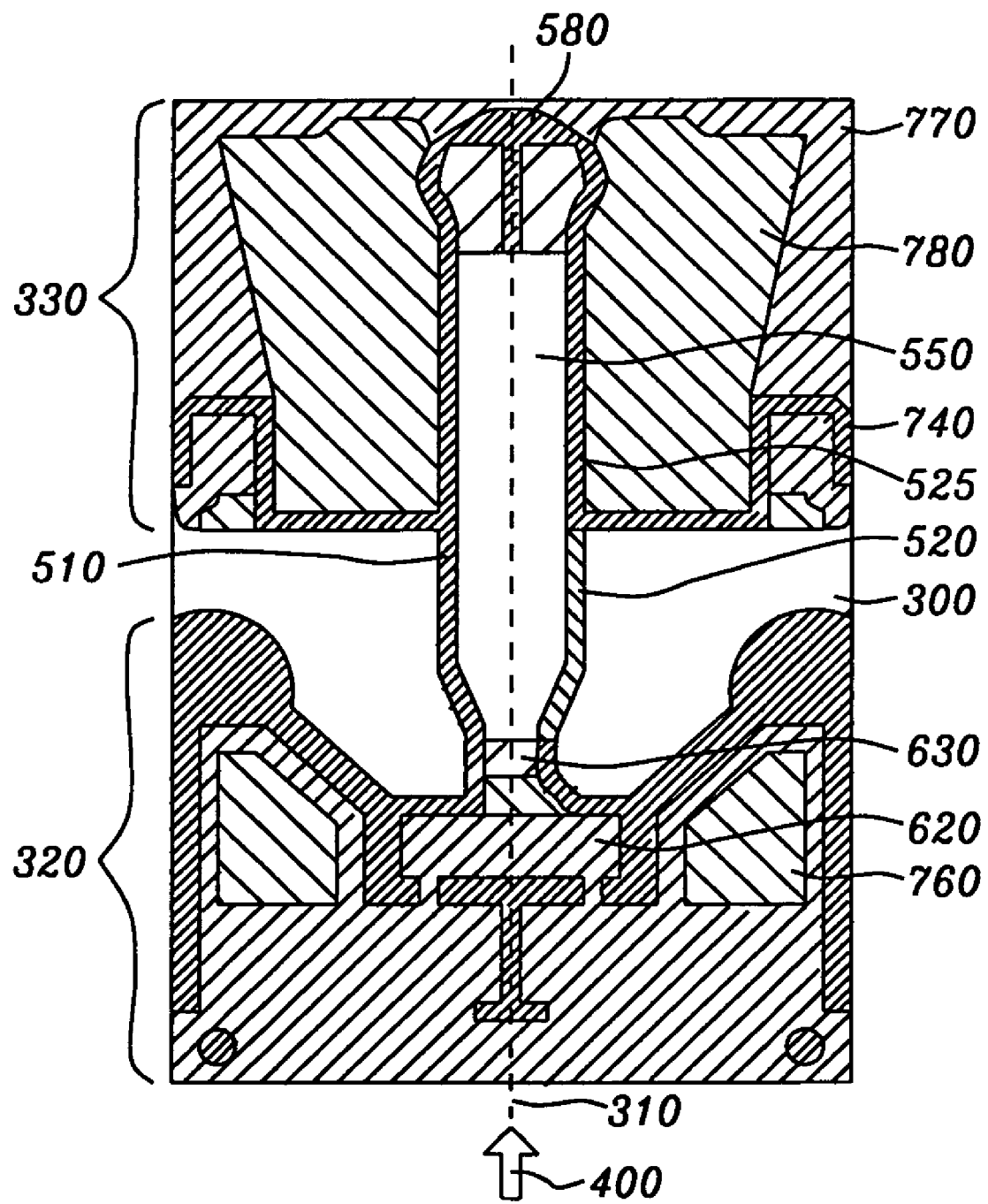
FIG. 3A is a schematic underside view of the slider ABS of the present invention. The illustration is shaded to distinguish depths of various topographical features.
Figure 3B:
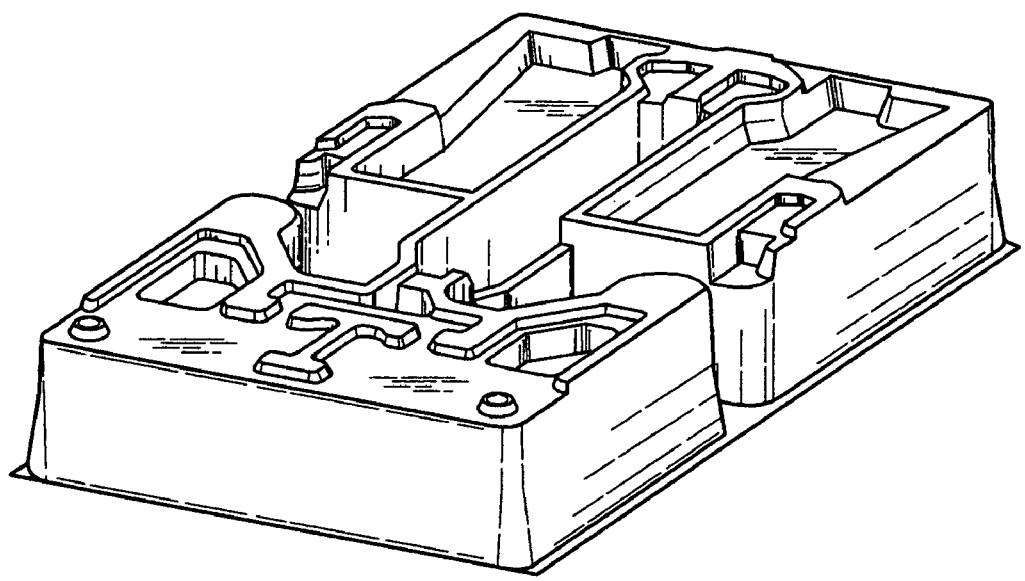
FIG. 3B is a schematic 3-D isometric view of the surface topography of the slider of FIG. 3A.

The preferred embodiment of the present invention is an aerodynamically stable slider, preferably designed in the form of the slider illustrated in FIGS. 3A, and 3B. This slider has an ABS topography that eliminates a variety of problems associated with sub-nanometer flying heights and meets the objects set forth above.

Figure 3C:
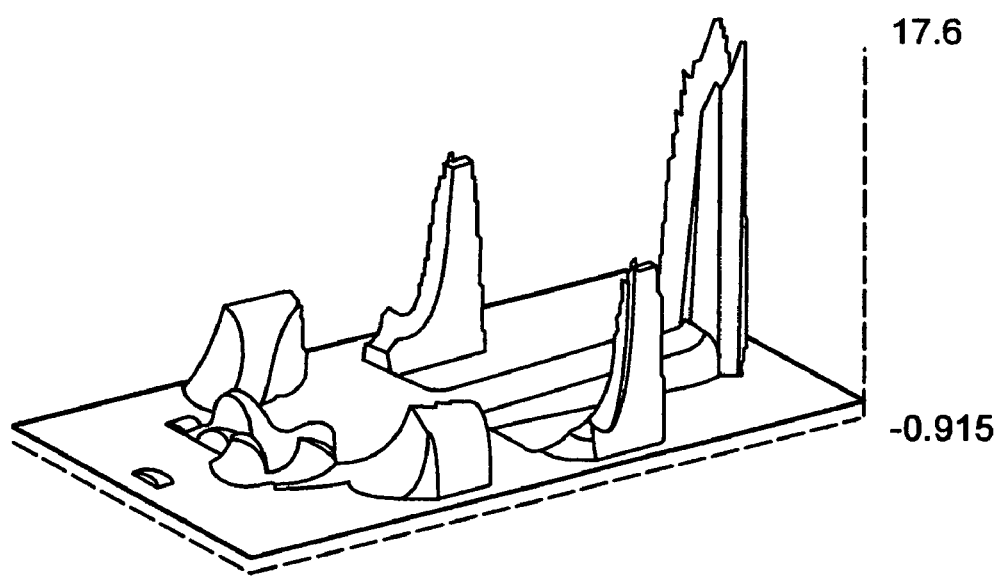
FIG. 3C is a schematic graphical illustration showing the distribution of air pressure across the ABS surface of FIG. 3A during HDD operation.
Figure 4A:
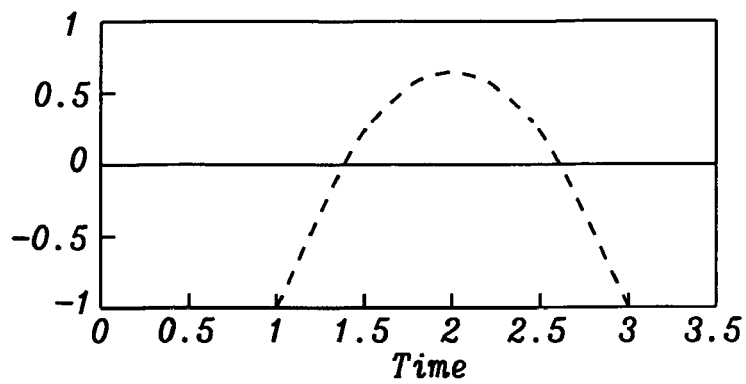
FIG. 4 includes a set of six graphs ((A), (B), (C), (D), (E), (F)) illustrating the response of the present slider to compressional shocks and comparing that response to the response of prior art sliders.
Figure 4B:
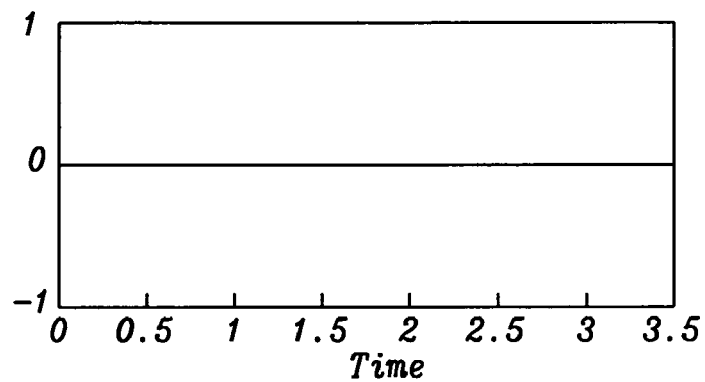
Figure 4C:
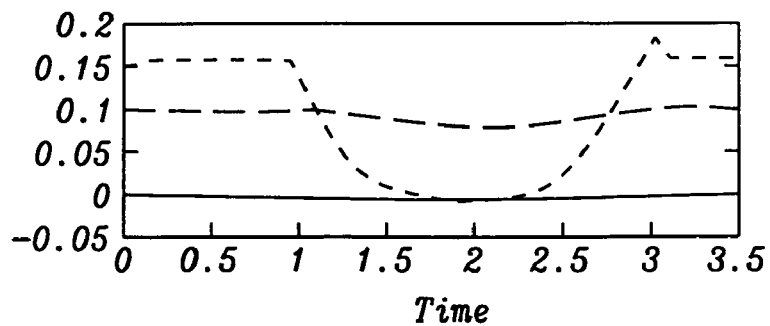
Figure 4D:
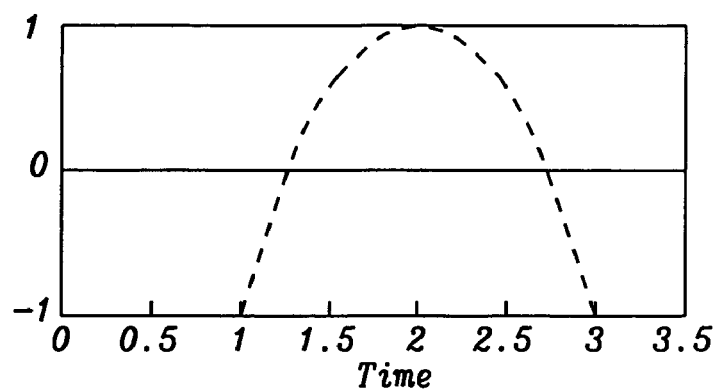
Figure 4E:
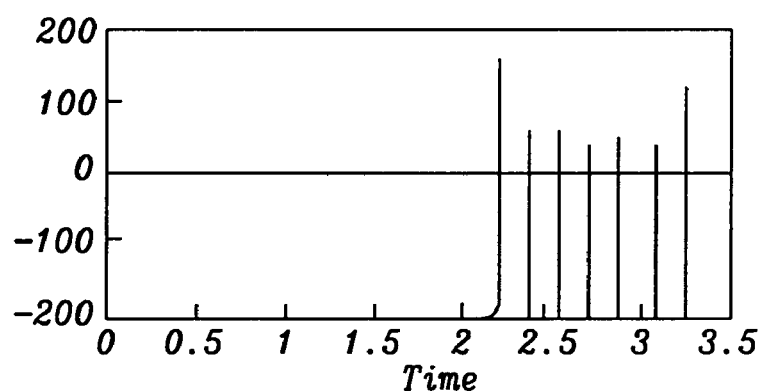
Figure 4F:
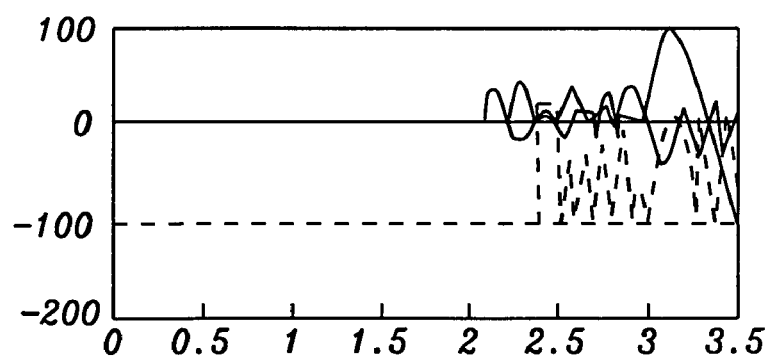

Referring now to FIGS. 3A, 3B and 3C there is shown, first in FIG. 3A, an underside ABS planar view of a preferred embodiment of the slider of the present invention. For purposes of clarity in the illustration, progressively lighter (less line density) shaded areas represent surface areas of greater depth relative to an uppermost plane of the slider ABS.

Next, in FIG. 3B, there is a 3-dimensional perspective illustration showing an alternative view of the slider in FIG. 3A. This view is presented solely for the purpose of visually clarifying the topography illustrated in the shaded planar view of FIG. 3A, it is not meant to indicate actual depths incised within the ABS topography.

Finally, in FIG. 3C there is shown a graphical representation of the air pressure distribution across the slider surface of FIG. 3A during HDD operation. The height of segments indicates the strength of the pressure. The vertical axis is for the purpose of indicating pressure strengths.

The variable depth slider ABS topography of FIG. 3A is produced by a sequence of three ion-milling operations producing final cumulative depths generally in a range between 0 microns and 200 microns. The slider as a whole has dimensions of length between approximately 0.85-1.25 mm, width between approximately 0.5-1.0 mm and thickness between approximately 0.16-0.3 mm.

As a result of the ion-milling operations, a total of five patterned layers is produced, each layer being characterized by a depth relative to a topmost ABS surface and a corresponding shading to indicate that depth. The five depths, indicated in the figure as ranging from no shading (deepest), to most dense shading (surface), are as follows: no shading, (140 microns deep); (34 microns deep); (25 microns deep); (9 microns deep); (0 microns) most densely shaded. These depths are produced by a sequence of three successive etches. The first etch produces partially formed features with depths of 9 microns. The second etch produces features at an additional depth of 25 microns relative to the first set of features, which will then include features with a depth of 34 microns. The final etch produces features at additional depth of 106 microns, which produces the deepest features with depths of 140 microns.

A characteristic of the ABS topography is a "deep air groove" (300), running transverse to the central axis (310) of the slider and essentially dividing the ABS into two portions: a "leading edge portion" (320) to the leading edge (LE) side of the slider and a "trailing edge portion" (330) to the trailing edge (TE) side of the slider. A broad arrow (400) points to the direction of airflow towards the LE of the slider during HDD operation. The deep air groove is unshaded, to indicate that it is one of the deepest feature of the ABS topography.

The deep air groove (300) does not run completely traverse the ABS surface, but is interrupted, or "bridged" by two rail-like edge segments of unequal height, (510) and (520). These rails actually form part of the peripheral edges of a "down-track channel" (550) that runs parallel to the central axis (310) of the slider. This channel can be approximately between 50% and 70% of the length of the slider and approximately between 105 and 20% of the width of the slider. The two peripheral edges are substantially uniformly separated and symmetrically spaced to either side of the central axis although, as noted above, their heights vary at the bridge segment and they taper towards each other slightly. The trailing edge end of this down-track channel terminates at the center pad (580) of the slider; the leading edge end of the channel is formed by the abovementioned tapering together of the peripheral edges, where a junction is formed with a "cross-track channel" (620) that is within the leading edge portion of the slider. The cross-track channel (620) has a transverse length that is between approximately 25% and 75% of the slider width. The width (longitudinally) of the cross-track channel is between approximately 35-75 microns.

The junction between the down-track and cross-track channels is formed as a "kink/bar" (630), which is a kinked portion of the two edges with a small bar, within the channel, connecting the edges. The down-track channel is also unshaded in the illustration and has the same maximum depth as the "deep air groove." One of the edge segments (510) runs the complete length of the channel (550) and has a constant height. The opposite segment (520) is not as high as the segment (510) in the region that bridges the deep air groove, but it rises (525) to the height of segment (510) on the TE side of the deep air groove. As noted above, these two segments are referred to as a "dual-height bridge" in the region where they bisect the deep air groove.

The "cross-track channel" (620) mentioned above is formed in the LE portion of the slider and, as noted above, is separated from the LE end of the down-track channel by a small "kink" and "bar" (630) that, together, effectively terminates the LE end of the down-track channel. This bar (630) is designed inside the down-track channel (550) to be pressurized for "preload" (suspension force) sensitivity control and finally for the purpose of compression shock improvement without an obvious drawback to Z-height (medium surface to suspension base plane distance) sensitivity. This provides a definite improvement in operational shock resistance by the use of ABS design than from suspension design, as noted in the objects of the invention.

Figure 5:
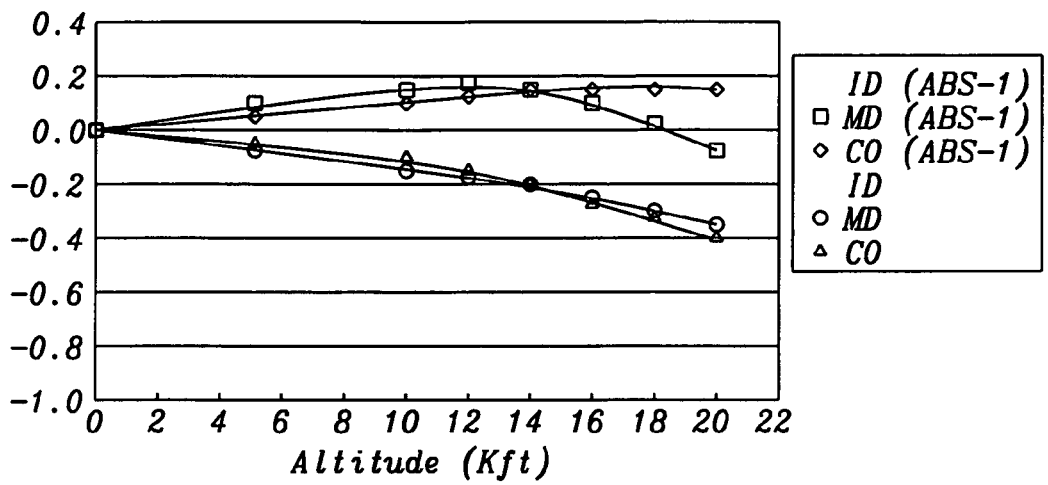
FIG. 5 is a graphical illustration of the response of the present slider to variations in altitude as made evident by its operation under reduced pressures.

As can be seen from the illustration in FIG. 3A, the intersection of the cross-track channel (620) with the down-track channel (550) forms a "T" shape, which serves to guide the airflow from the LE of the slider directly onto the center pad (580) in the TE portion of the slider within which the transducer is embedded. This guided airflow exists even at high altitudes, which therefore improves slider performance under those conditions as well. Importantly, the T-shape of the channel structure and the ability to vary the depth and width of the down-track channel, allows higher pressure to be targeted specifically at the center pad, so that the channel structure serves to transfer the pressure where it is most advantageous, rather than become itself a region of high pressure. This will also be discussed below and reference to FIG. 3(C) will be made. Furthermore, because of the dual-height bridge, (510) and (520), between the two portions of the deep air groove (300), the amount of airflow is also controlled at various skew angles, which fine-tunes both the fly-height profile and the altitude uniformity at different tracks. This will be seen below with reference to FIG. 5.

Depending on HDD design, in terms of radius, skew and rotational speed, the width and depth of the down-track channel can be adjusted to build up the pressure on the center pad (580) rather than in the channel itself or on the side pads (740) surrounding the channel. This targeted pressure buildup is shown in FIG. 3(C), where the sharp pressure peak over both sides of the center pad is indicated. In this way the air-bearing stiffness in both the pitch and roll directions is significantly enhanced and leads to very low sensitivity of the slider fly height to slider crown, PSA and Z-height as shown graphically in FIG. 9 and the discussion below.

Figure 6A:
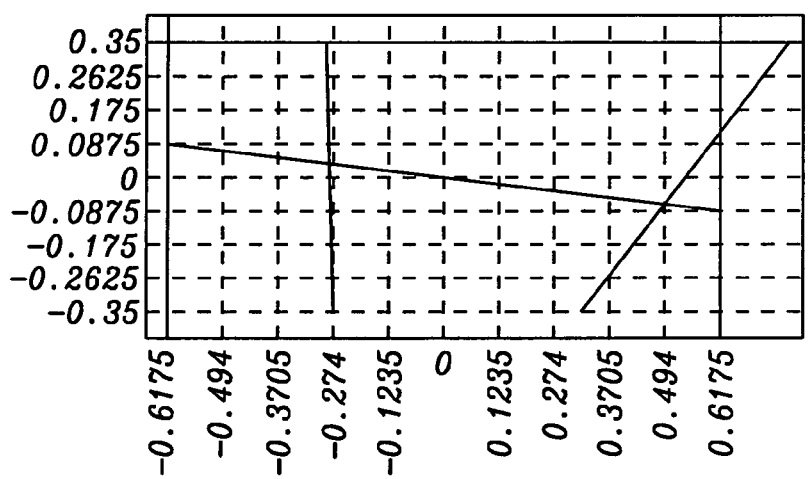
FIGS. 6A and 6B is a comparison of the damping coefficients of the present slider (6A) to those of a prior art slider (6B) with respect to normal modes of oscillation of the air bearing surface as triggered by head-disk interactions.
Figure 6B:
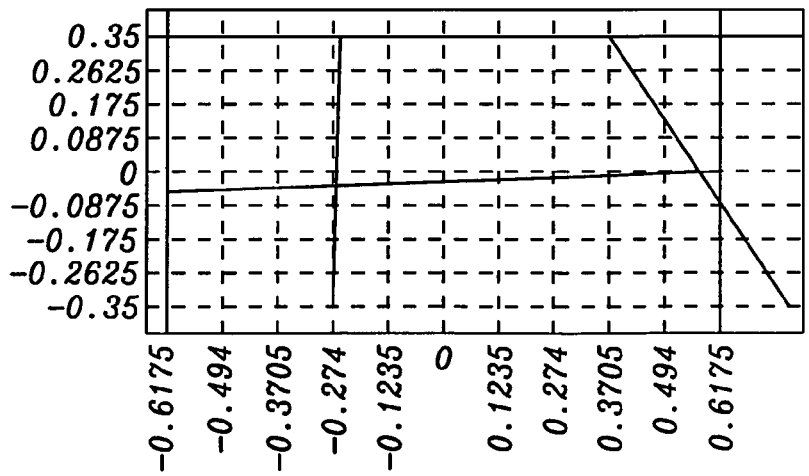

As a result of the configuration of the channels and negative pressure air pockets (760) in the LE portion of the slider and trailing edge portion (780), the airflows beneath the slider are violently disturbed, which promotes excellent damping characteristics of first pitch and roll modes that are excited at the air-bearing natural frequencies of the slider during head/disk interactions. FIG. 6A gives a schematic graphical indication of the very high damping coefficients of the first pitch and roll modes in the air-bearing natural frequencies of the present slider. For comparison purposes, FIG. 6B, gives an indication of the same modes in a prior art slider.

Figure 7A:
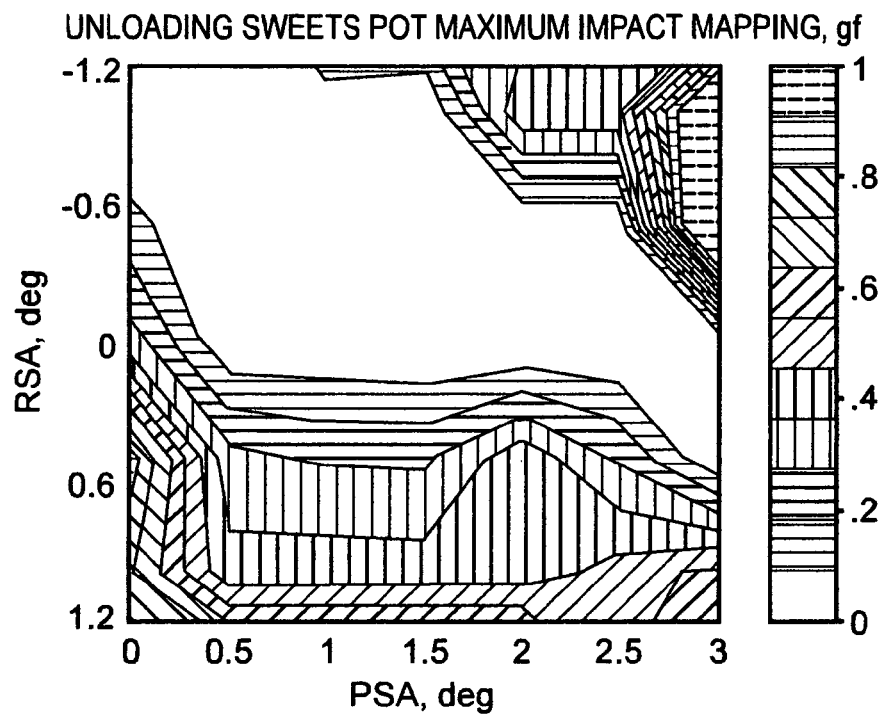
FIGS. 7A, 7B, 7C and 7D shows the reaction characteristics ("sweetspot") of the present slider to unloading as a function of the presence or absence of a dam at the TE.
Figure 7B:
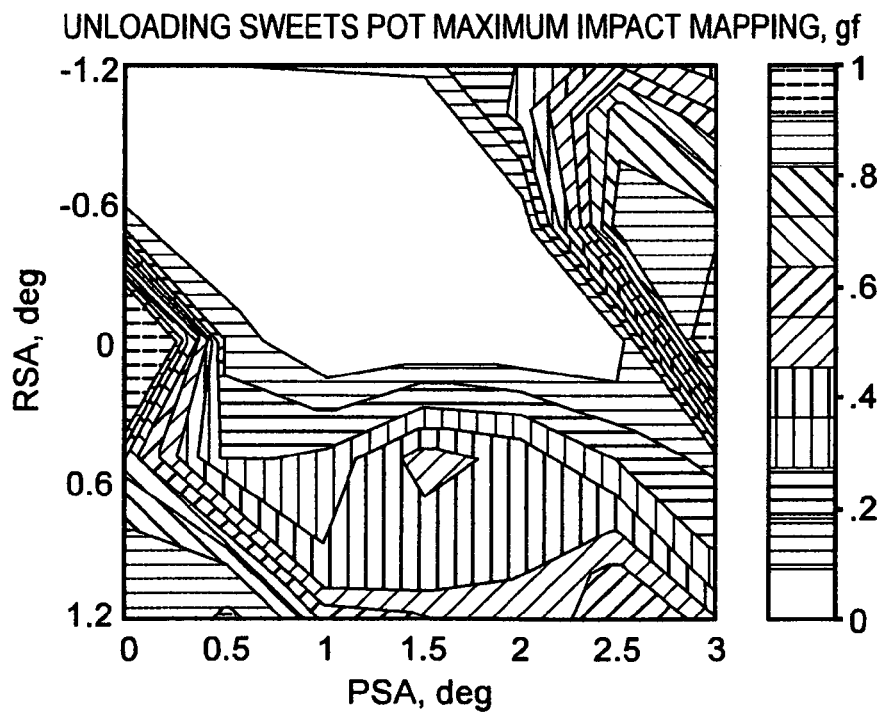
Figure 7C:
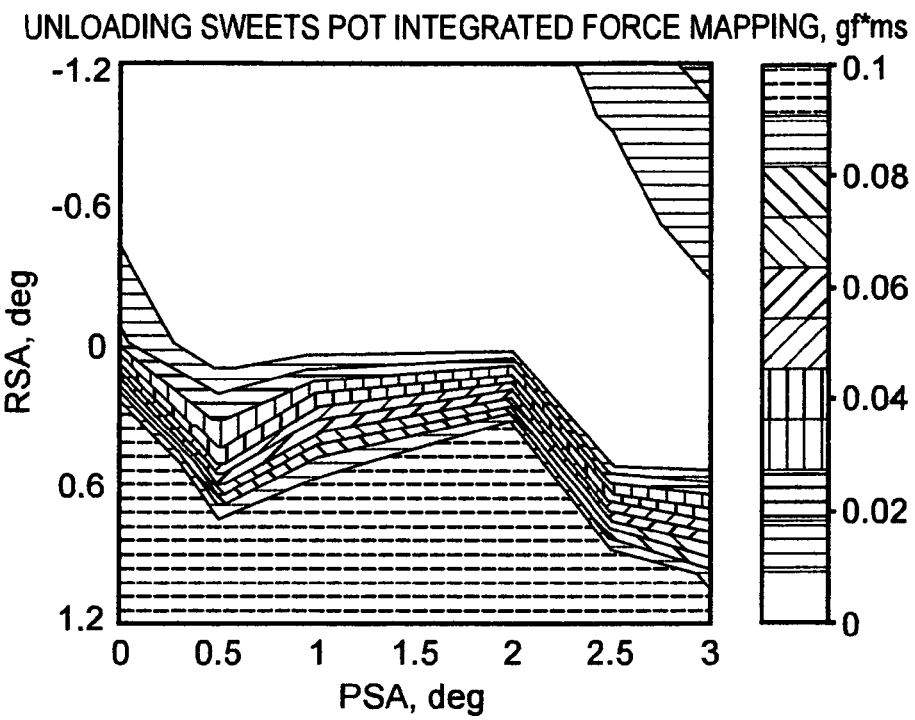
Figure 7D:
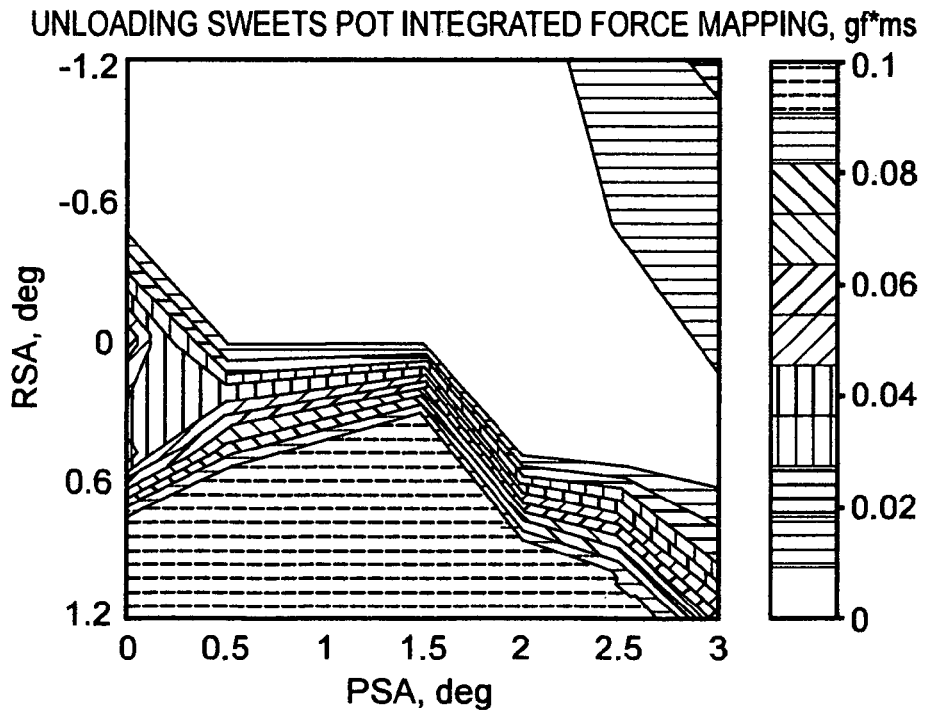

In addition to the T-shaped channels shown in FIG. 3A, a closed shallow dam (770) is formed at the TE of the slider to serve as both a load/unload (L/UL) supporter and a backflow blocker. During the dynamic L/UL process, the large pitch static angle (PSA) and roll static angle (RSA) could cause the TE corners of the slider to become its lowest points and to even contact the disk. In this case the closed shallow dam will provide the maximum amount of additional lifting force to support the TE of the slider at the extreme fly height pitch and roll angle and will mitigate head/disk contact at the TE and enlarge the margin of the L/UL "sweetspot" as illustrated schematically in FIGS. 7A through 7 D (discussed below). The "sweetspot" is the angular range in PSA and RSA within which the slider can successfully load/unload without head/disk contact. The larger the sweetspot, the greater is the margin within which successful HDD operation occurs and failures are avoided. In addition, by blocking airflow that would typically enter beneath the slider at its trailing edge (backflow) the picking up of lubricant and its accumulation on the ABS is significantly reduced or eliminated.

In FIG. 7 A there is shown a graphical indication of the maximum impacts during unloading occurring for the present slider as compared with FIG. 7 B which shows the same graphical analysis for a slider similar to the present slider in all respects, but lacking the shallow dam. The unshaded areas of the graphs indicate regions of minimum impact (the "sweetspot"). These two slider configurations are illustrated in FIGS. 8 A and 8 B respectively. FIGS. 7 C and 7 D, show graphical representations of the integrated force experienced during unloading the present slider and the slider lacking the shallow dam. The unshaded region correspond to a range where the impacts and integrated forces are the least, indicate the optimal sweetspot areas. Comparing the two graphs A and C, to the two graphs B and D respectively, it is seen that the present slider A and C produces an improved (larger area) sweetspot.

During the HDD operation, the disk rotates at an essentially constant rotational velocity which generates the positive and negative air pressures beneath the slider ABS (see FIG. 3C) and creates the air-bearing layer that supports the slider and provides its aerodynamic properties. Unfortunately, in order to achieve an optimal aerodynamic performance conventional air-bearing designs incorporate particular geometric features that make the resulting airflow more susceptible to creating regions of stagnation and even to flow direction reversals (eg. backflow under the trailing edge), both of which can contribute to lubricant accumulations in some severe operating conditions such as hot/wet environments. This accumulation of lubricant can result in head/disk interactions (HDI) and even lead to HDD failure. We have found that a shallow dam at the TE of the ABS generates enough shear force to prevent airflow reversal at the TE, to significantly reduce lubricant pickup and accumulation and to carry away any lubricant on the ABS that has been picked up.

Figure 8A:
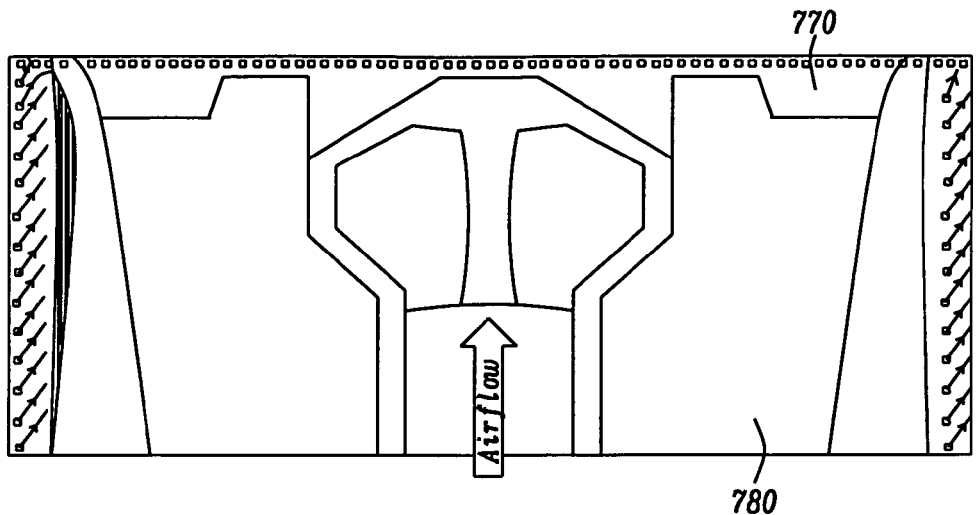
FIGS. 8A and 8B are schematic illustrations showing the absence (in A) of backflow (indicated by streamlines) in the present slider as a result of the shallow closed dam at the trailing edge, as compared to the backflow associated with the same slider when not provided with the shallow closed dam. In 8B, streamlines are shown entering air pockets because of the absence of the shallow dam.
Figure 8B:
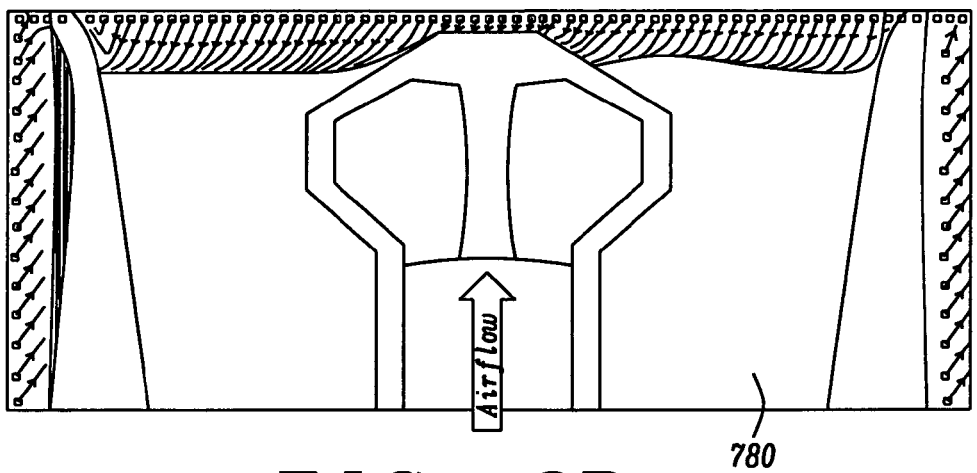

FIG. 8A shows a portion of the trailing edge of the present slider of FIG. 3A, which includes a shallow dam (770). The shallow dam (770) in front of the air pockets (780) blocks airflows from these pockets and eliminates air backflow that would cause the accumulation of lubricant within those pockets (see also FIG. 2 showing prior art slider lubricant accumulations). FIG. 8B shows, schematically, a trailing edge portion of a slider corresponding generally to the slider of FIG. 8A, but with the closed shallow dam absent. As a result, a backflow of air, shown as streamlines, (arrows originating at small squares show the incurving airflow streamlines) moves from the trailing edge into the air pockets (780) and creates the conditions that produce an accumulation of lubricant. In the present invention shown in FIG. 8A, the shallow dam (770) serves to block backflow and the streamlines are virtually absent.

Referring now back to the graphs of FIG. 4, there are shown a sequence of schematic graphical representations of the response of the present slider to operational shocks as compared to the response of a prior art slider to a similar shock. Graphs A, B and C refer to the performance of the present invention; graphs D, E and F refer to the performance of a prior art slider.

Referring first to A and D, there is shown a parabolic operational shock pulse (load variation) of 2 milliseconds duration (abscissa). Referring next to B and E, there is shown the response of the slider in terms of a potential head/disk interaction. The uniform horizontal line in B indicates that there has been no impact and no variation of pitch and roll moments. The graph in E shows a succession of spikes indicating impacts and sharp variations in pitch and roll. Finally, the graphs in C and F depict the changes in dynamic flying attitude, specifically changes in minimum spacing (top curve) and pitch (middle curve) and roll (bottom curve) angles. Graph C shows very smooth responses that correlate with the impulse itself A. Graph F shows a more chaotic response of the slider, with the top curve indicating overlaps of the pitch and roll angular variations and the bottom curve showing the sharp variations in spacings.

Figure 9:
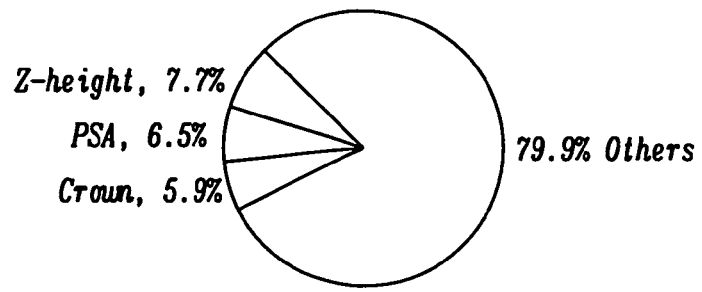
FIG. 9 is a graphical pie-chart representation showing the contribution of crown, PSA and Z-height to fly height sigma.

Referring finally to FIG. 9, there is shown a pie graph indicating the contributions of various suspension and slider factors to the fly height sigma. The graph illustrates that Z-height sigma is relatively insensitive to fly height sigma (7.7% dependence). This is important because Z-height is one of the most difficult parameters to control in head/disk assembly and yet it is a very important parameter in the control of fly height variations. In typical prior art slider designs there is a 20% relationship between Z-height and fly height sigmas.

As is understood by a person skilled in the art, the preferred embodiment of the present invention is illustrative of the present invention rather than being limiting of the present invention. Revisions and modifications may be made to methods, processes, materials, structures, and dimensions through which is formed a slider having an ABS topography that provides proper flying height, shock protection and aerodynamic stability under altitude variations and skew angle variations and eliminates the accumulation of lubricant during hard disk drive operation, while still providing such a slider, formed in accord with the present invention as defined by the appended claims.

What is claimed is:
1. A slider, comprising:
A backside surface whereby said slider attaches to a suspension;
an ABS side, having a leading edge and a trailing edge wherein said leading edge and said trailing edge have a common width which is the slider width and wherein the slider length is the longitudinal distance between said leading edge and said trailing edge, wherein said ABS side has a variable depth topography and faces a surface of a rotatable disk;

a leading edge portion and a trailing edge portion, wherein said portions are separated by a transverse deep air groove;

a center pad containing an embedded transducer formed in said trailing edge portion;

a transversely directed cross-track channel formed in said leading edge portion;

a centrally positioned down-track channel extending between said trailing edge portion and said leading edge portion, wherein said down-track channel has a leading edge end and a trailing edge end and a longitudinal periphery formed by separated longitudinal edges directed longitudinally along a central axis, wherein said longitudinally directed edges of said channel are of equal height within said trailing edge portion but are of unequal height where they bisect said deep air groove and form a dual-height bridge that bisects said deep air groove and terminates to form a kink/bar, junction with said cross-track channel and forming, thereby, a T-shaped airflow channeling structure, and wherein said trailing edge end of said down-track channel abuts said center pad;

a first pair of air pockets formed in said trailing edge portion to either side of said down-track channel;

a second pair of air pockets formed in said leading edge portion to either side of said cross-track channel;

a closed shallow dam along said trailing edge forming a trailing edge boundary of said first pair of air pockets and closing off outflows of air from said first pair of air pockets.

2. The slider of claim 1 wherein said kink/bar at the junction between said down-track channel and said cross-track channel allows the channel to be pressurized for preload sensitivity control.

3. The slider of claim 1 wherein said T-shaped junction between said down-track channel and said cross-track channel acts as an airflow guide to said center pad and provides pressurization of said pad even under high-altitude conditions.

4. The slider of claim 1 wherein said dual height bridge allows the control of airflow under a variation of skew angle.

5. The slider of claim 1 wherein said closed shallow dam prevents backflow of air beneath said trailing edge and thereby significantly eliminates pickup and accumulation of disk lubricant and channeling away whatever pickup might occur.

6. The slider of claim 5 wherein said closed shallow dam rises approximately 25 microns above said first pair of air pockets of which it forms a trailing edge boundary.

7. The slider of claim 1 wherein said topography disturbs the pattern of airflow sufficiently to damp first pitch and roll modes at natural frequencies of the air bearing layer.

8. The slider of claim 1 wherein adjusting the width and depth of said down-track and cross-track channels provides a targeted buildup of pressure over said center pad.

9. The slider of claim 1 wherein said down-track channel and said deep air groove are etched to a depth of approximately 140 microns.

10. The slider of claim 1 wherein said cross-track channel is etched to a depth of approximately 9 microns.

11. The slider of claim 1 wherein said first and second air pockets are etched to a depth of approximately 34 microns.

12. The slider of claim 1 wherein said dual-height bridge is formed by two peripheral lateral edges of said cross-track channel, wherein the taller of said edges is etched to a depth of 9 microns and the other of said edges is etched to a depth of 25 microns.

13. The slider of claim 1 wherein a distance between said leading and trailing edges is a length dimension of between approximately 0.85 and 1.25 mm.

14. The slider of claim 1 wherein a distance between lateral sides is a width dimension of between approximately 0.5 and 1.0 mm.

15. The slider of claim 1 wherein said down-track channel has a length between approximately 50% and 70% of the slider length a width between parallel segments of peripheral edges of between approximately 10% and 20% of the slider width.

16. The slider of claim 1 wherein said cross-track channel has a transverse length of between approximately 25% and 75% of the slider width.

17. The slider of claim 1 wherein a thickness dimension between said ABS plane and a backside surface is between approximately 0.16 and 0.3 mm.

18. A method of forming a slider, comprising:
providing a slider substrate;
in a first ion-milling process, etching a first region within an ABS side of said substrate to a depth of 9 microns;
in a second ion-milling process, etching a second region within said ABS side of said substrate to an additional depth of 25 microns, wherein said second region now forms second areas of approximate cumulative depths of 25 microns and 34 microns;
in a third ion-milling process, etching a third region within said ABS side of said substrate to an additional depth of 106 microns, wherein said third region comprises a third area of approximate depth 140 microns.

19. The method of claim 18 wherein said third ion-milling process forms a deep air groove and a down-track channel.

20. The method of claim 18 wherein said second ion-milling process forms air pockets, and a lower part of a dual-height bridge.

21. The method of claim 18 wherein said first ion-milling process forms a cross-track channel.

* * * * *